Feb. 22, 1966     D. G. SPARKS ETAL     3,237,177
TRAILER TRACKING APPARATUS
Filed June 22, 1962
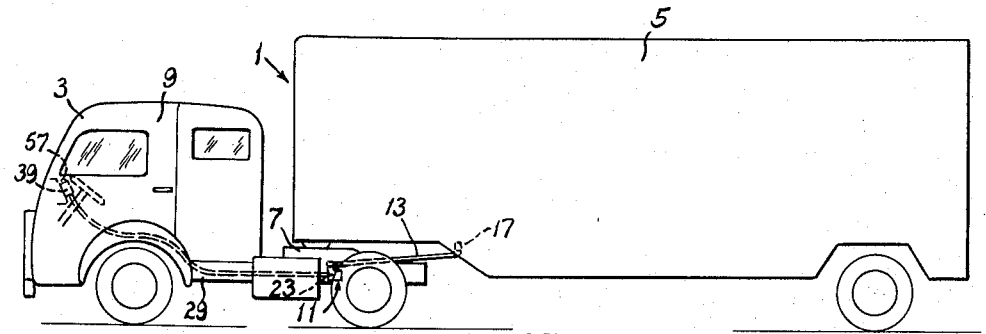
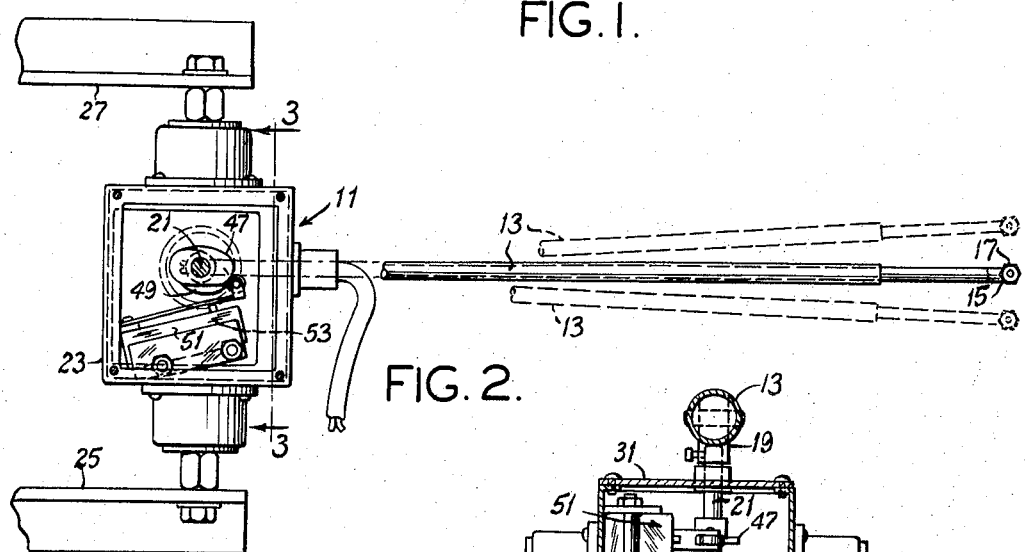
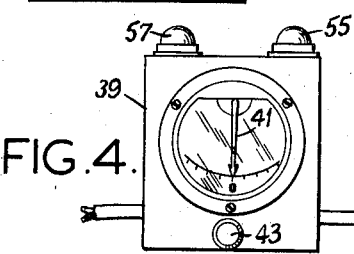
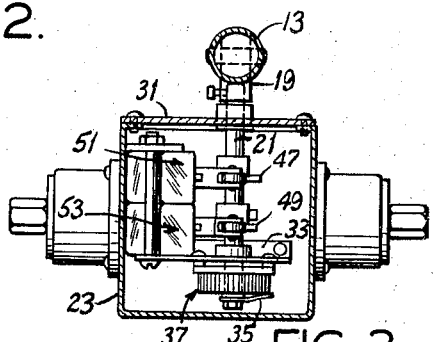
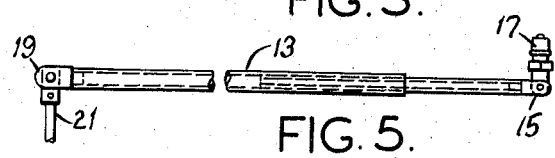
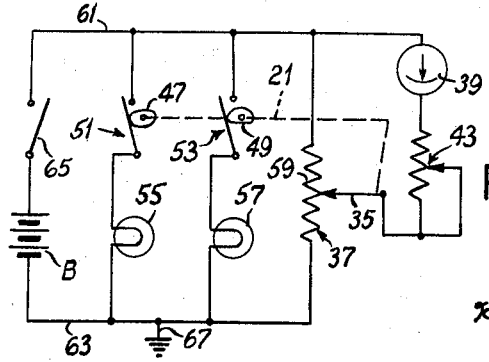
Donald G. Sparks,
Leslie G. Procasky,
Inventors.
Koenig, Pope, Senniger and Powers,
Attorneys.

United States Patent Office 3,237,177
Patented Feb. 22, 1966

3,237,177
TRAILER TRACKING APPARATUS
Donald G. Sparks, 2320 Lynch Ave., Granite City, Ill., and Leslie G. Procasky, 103 Oakview Drive, Belleville, Ill.
Filed June 22, 1962, Ser. No. 204,453
9 Claims. (Cl. 340—181)

This invention relates to trailer tracking apparatus, and more particularly to apparatus for indicating the angular relationship between a trailer and a power unit, such as a tractor, towing the trailer.

Among the several objects of the invention may be noted the provision of trailer tracking apparatus which continuously provides an indication to the tractor driver of the angular relationship between the trailer and tractor; the provision of trailer tracking apparatus of the class described which, in addition to providing a continuous indication of the tractor-trailer relationship, provides a warning signal if the angular relationship between the tractor and trailer exceeds a predetermined amount, thereby indicating to the driver that corrective action must be taken to prevent further swing of the trailer; and the provision of trailer tracking apparatus of the class described which is of simplified economical construction and reliable in operation. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a side elevation of a tractor-trailer assembly, showing a trailer tracking apparatus of this invention attached thereto;

FIG. 2 is an enlarged fragmentary plan view of the tracking apparatus, certain parts being broken away;

FIG. 3 is a vertical section taken on line 3—3 of FIG. 2;

FIG. 4 is an enlarged front elevation of a meter which forms part of the apparatus;

FIG. 5 is detail in side elevation of an extensible arm of the apparatus; and

FIG. 6 is a wiring diagram.

Corresponding reference characters indicate corresponding parts throughout the several views of the drawings.

During daylight hours, drivers of tractor-trailer assemblies rely on rear view mirrors attached to the power unit for viewing the position of the trailer towed by the tractor. At night, the position of the trailer assembly is indicated by viewing the clearance lights of the trailer in the tractor mounted mirrors. Due to the construction of conventional tractor-trailer assemblies, and adverse road and weather conditions, the trailer may tend to jackknife or pivot relative to the tractor to one side or the other. For example, the wind velocity may be such as to cause the trailer to tend to sway toward one side of the road. If the trailer should begin to sway, the driver should immediately be made aware of the swaying movement and the direction in which the trailer is swaying. He can then take corrective action, such as steering or applying the brakes in a particular manner, to bring the trailer back to its proper position. If the trailer sways too far in one direction before the driver becomes aware of the condition, it may be too late to correct the hazardous condition created.

At night, if the rear end of the trailer has pivoted or jackknifed 2 or 3° for example before the driver becomes aware of it, he can no longer view the trailer clearance lights in the mirrors. Therefore, the driver has no way of knowing in which direction the trailer is swinging or even that it is swinging, and may not be able to take any corrective action until it is too late to stop complete jackknifing of the trailer. By means of the present invention, the driver is given a continuous indication of the angular relationship between the trailer and the tractor and is also given a signal if the trailer should swing a predetermined amount from its normally aligned position.

Referring to the drawings, a tractor-trailer assembly is generally indicated at 1. The power unit vehicle or tractor of the assembly is indicated at 3 and the trailer vehicle which is towed by tractor 3 is indicated at 5. The trailer 5 is pivotally connected to tractor 3 by what may be called a fifth wheel 7. The cab of the tractor is indicated at 9.

The trailer tracking apparatus of this invention is generally indicated at 11. This apparatus includes a telescoping arm 13, one end of which is clevised as indicated at 15. A quick detachable coupling 17 is connected to arm 13 in clevis 15. Coupling 17 is adapted to be connected to a mating coupler (not shown) attached to the bottom of the bed of the trailer rearwardly of the fifth wheel 7. The other end of the arm 13 is provided with a clevis 19 in which is pinned the upper end of a shaft 21 rotatably mounted in a housing 23 located adjacent the fifth wheel 7. Arm 13 is swingable about the axis of the pin in clevis 19.

Housing 23 is bolted to two angle irons 25 and 27 secured to the tractor frame 29. A plate 31 forms the top of housing 23 and journals the upper portion of shaft 21. The lower portion of shaft 21 is journalled in a bracket 33 connected to the inside of housing 23. With the arrangement of parts thus far described it will be seen that pivotal movement of the trailer about the fifth wheel 7 causes a pivotal movement of arm 13 and rotation of shaft 21. As the shaft 21 is mounted slightly to the rear of the fifth wheel 7 (it being exceedingly difficult to mount the shaft 21 at the center of the fifth wheel 7), the pivotal movement of arm 13 and the rotational movement of shaft 21 is, in degrees, proportional rather than equal to the pivotal movement of the trailer 5. However, the rotation of shaft 21 is a function of the pivotal or angular movement of trailer 5. As will become apparent, the degree of pivotal movement of trailer 5 is transmitted to a visual indicator located in the cab 9 of tractor 3.

Attached to the lower end of shaft 21 is an electrically conductive arm 35 (see FIG. 5) constituting a movable contact arm or slider (see FIG. 5) of a potentiometer type of variable resistance 37. Potentiometer 37 is electrically connected to a meter 39 (an ammeter) located in the cab 9. Meter 39 has an indicating needle 41 which may be adjusted to a generally vertical zero position by a zero adjust 43. Pivotal movement of trailer 5, and consequently rotational movement of shaft 21 and potentiometer arm 35 causes the needle 41 to swing to the left or right of its zero position (depending on the direction the trailer is pivoting) a proportional amount, thereby producing a continuous indication of the trailer position relative to the tractor 3.

Two cams 47 and 49 are adjustably mounted on shaft 21 and rotate with the latter. Cam 47 is adapted to close a switch 51 mounted in housing 23 upon a predetermined degree of rotation of shaft 21 in a counterclockwise direction as viewed in FIG. 2. Cam 49 is adapted to close a switch 53 also mounted in housing 23 upon a predetermined degree of rotation of shaft 21 in a clockwise direction as viewed in FIG. 2. The switches 51 and 53 will be closed by the respective cam when arm 13 has moved to the corresponding upper or lower broken line position in FIG. 2. The position of cams 47 and 49 may be adjusted to actuate the respective switch 51 and 53 when the rear end of the trailer is offset any predetermined amount from a central position. As will hereinafter be made apparent switches 51 and 53 are adapted, when closed, respectively to energize indicating lamps 55 and 57 mounted on meter 39 in cab 9. Thus, a predetermined amount of pivotal movement of the rear end of trailer 5 toward the right side of the road will cause bulb 55 to be energized and a predetermined amount of pivotal movement of the rear end of the trailer toward the left side of the road will cause lamp 57 to be energized. It has been determined that with a twenty-four foot trailer, a signal to the driver when the rear end of the trailer has swung approximately three feet from its central tracking position will normally allow him sufficient time to apply corrective measures before the trailer movement becomes uncontrollable. Each of the lamps is therefore adapted to indicate an identifying characteristic of trailer movement, i.e., each lamp, when energized, will indicate that the trailer has pivoted a predetermined amount to one side or the other. To further indicate that the trailer has swung the predetermined amount to one side or the other the lamps 55 and 57 may be different colors, such as red and green.

A wiring diagram for the apparatus is shown in FIG. 6. The tractor battery is indicated at B. Potentiometer arm 35 is in contact with a fixed resistance 59 of the potentiometer 37, the resistance 59 being connected across lines 61 and 63 which are connected to the terminals of battery B. Line 61 includes the tractor ignition switch 65 and line 63 is grounded as indicated at 67. The meter 39 and its zero adjust 43, the latter being a conventional variable resistance, are connected in series between line 61 and potentiometer arm 35. Switch 51 and lamp 55 are connected in series across lines 61 and 63 and, similarly, switch 53 and lamp 57 are connected in series across lines 61 and 63.

Operation of the apparatus is as follows:

Assuming the trailer is in its proper tracking position, i.e., the telescoping arm 13 is in its solid line position as viewed in FIG. 2, the zero adjust 43 is manipulated to bring the needle 41 to its vertical or zero position. As long as the trailer is tracking properly, the needle 41 remains on the zero position. Additionally, the lamps 55 and 57 are deenergized. As the trailer begins to sway to the right side of the road, for example, arm 13 pivots and the shaft 21 and potentiometer arm 35 rotate a proportional amount in a counterclockwise direction as viewed in FIG. 2. This causes the voltage on slider 35 with respect to ground to increase a certain amount and needle 41 swings to the right a proportional amount, thereby indicating to the driver the angular relationship between the tractor and the trailer. If the rear end of the trailer swings more than a predetermined amount to the right, three feet for a twenty-four foot trailer, for example, cam 47 causes switch 51 to close and lamp 55 is energized, thereby indicating that some corrective measures are necessary to bring the trailer back into alignment. The driver notes the position of the needle 41 in such case to determine just how much the trailer has pivoted, and applies the proper corrective measures to bring the trailer back into alignment. It will be understood that pivotal movement of the trailer to the left, i.e., movement of arm 13 in clockwise direction as viewed in FIG. 2, will cause needle 41 to swing to the left of its zero position. Pivotal movement of the trailer to the left beyond the predetermined amount will cause cam 49 to close switch 53 thereby energizing lamp 57.

It will be seen that this apparatus provides both a continuous indication of the trailer position by the meter 39 and a warning indication of significant trailer movement by the energization of lamps 55 and 57, thus enabling the driver to know the angular position of the trailer at all times, both day and night, and to provide corrective measures when necessary with a minimum of delay.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for indicating angular movement of a trailer relative to a tractor towing the trailer, said trailer having a pivotal connection to the tractor, comprising a housing mounted on the tractor adjacent said pivotal connection and offset from said pivotal connection, a shaft journalled for rotation in the housing on an axis offset from and generally parallel to the axis of said pivotal connection, one end of said shaft extending out of the housing, an extensible arm attached at one end thereof to said one end of said shaft, said arm extending rearward from said housing and having its other end connected to the trailer by means of a detachable coupling, a variable resistance potentiometer in said housing operable by said shaft, the resistance of said potentiometer varying as a result of rotation of the shaft by said arm upon pivoting of the trailer relative to the tractor about said pivotal connection, a meter in the tractor and an electrical circuit interconnecting the potentiometer and the meter, said meter indicating to the driver of the tractor the pivotal movement of the trailer.

2. Apparatus as set forth in claim 1 wherein said potentiometer comprises a resistance fixed in position in said housing, and an electrically conductive potentiometer arm on said shaft in said housing, said potentiometer arm occupying a zero position when the trailer is aligned with the tractor and swinging one way or the other when the trailer angles relative to the tractor, said circuit including connections to said resistance and said potentiometer arm, and means in said circuit comprising a variable resistance for adjusting the meter to a zero reading when the trailer is aligned with the tractor.

3. Apparatus as set forth in claim 2 wherein said adjusting resistance is in the meter in the tractor.

4. Apparatus as set forth in claim 1 further comprising a pair of switches mounted in the housing, means on the shaft in the housing for closing one of said switches when said arm swings a predetermined amount in one direction, means on the shaft in the housing for closing the other of said switches when said arm swings a predetermined amount in the other direction, a first warning signal in the tractor, an electrical circuit interconnecting said first signal with one switch, a second warning signal in the tractor, and an electrical circuit interconnecting said second signal with the other switch.

5. Apparatus as set forth in claim 4 wherein said warning signals comprise lamps mounted on the meter.

6. Apparatus for indicating angular movement of a trailer relative to a tractor towing the trailer, said trailer having a pivotal connection to the tractor, comprising a housing mounted on the tractor adjacent said pivotal connection and offset from said pivotal connection, a shaft journalled for rotation in the housing on an axis offset from and generally parallel to the axis of said pivotal connection, one end of said shaft extending out of the housing, an extensible arm attached at one end thereof to said one end of said shaft, said arm extending rearward from said housing and having its other end connected to the trailer by means of a detachable coupling, a pair of switches mounted in the housing, means on the shaft in the housing for closing one of said switches when said arm swings a predetermined amount in one direction, means on the shaft in the housing for closing the other of said switches when said arm swings a predetermined amount in the other direction, a first warning signal in the tractor, an electrical circuit interconnecting said first signal with one switch, a second warning signal in the tractor, and an electrical circuit interconnecting said second signal with the other switch.

7. Apparatus for attachment of a trailer and a tractor for indicating angular movement of the trailer relative to the tractor about the pivotal connection of the trailer to the tractor comprising a housing, means for mounting the housing on the tractor adjacent said pivotal connection and offset from said pivotal connection, a shaft journalled for rotation in the housing on a generally vertical axis and having one end extending out of the housing, a telescoping arm having one end pivotally connected to said one end of the shaft for swinging movement about an axis transverse to the shaft, a coupling at the other end of the arm for detachable connection to the trailer, a variable resistance potentiometer in the housing, and means for electrically interconnecting said potentiometer with a meter in the tractor.

8. Apparatus as set forth in claim 7 further comprising a pair of switches mounted in the housing, means for electrically interconnecting said switches with respective warning signals in the tractor, means on the shaft in the housing for closing one of said switches when said arm swings a predetermined amount in one direction, and means on the shaft in the housing for closing the other of said switches when the arm swings a predetermined amount in the other direction.

9. Apparatus for attachment to a trailer and a tractor for indicating angular movement of the trailer relative to the tractor about the pivotal connection of the trailer to the tractor comprising a housing, means for mounting the housing on the tractor adjacent said pivotal connection and offset from said pivotal connection, a shaft journalled for rotation in the housing on a generally vertical axis having one end extending out of the housing, a telescoping arm having one end pivotally connected to said one end of the shaft for swinging movement about an axis transverse to the shaft, a coupling at the other end of the arm for detachable connection to the trailer, a pair of switches mounted in the housing, means for electrically interconnecting said switches with respective warning signals in the tractor, means on the shaft in the housing for closing one of said switches when said arm swings a predetermined amount in one direction, and means on the shaft in the housing for closing the other of said switches when the arm swings a predetermined amount in the other direction.

References Cited by the Examiner
UNITED STATES PATENTS

| | | | |
|---|---|---|---|
| 2,214,161 | 9/1940 | Cater | 340—282 |
| 2,390,317 | 12/1945 | O'Dwyer | 340—282 |
| 2,459,261 | 1/1949 | Browne | 340—181 |
| 2,886,299 | 5/1959 | Heimaster et al. | 340—282 |

NEIL C. READ, *Primary Examiner.*

LOUIS J. CAPOZI, *Examiner.*